United States Patent
Le et al.

(10) Patent No.: US 7,922,196 B2
(45) Date of Patent: Apr. 12, 2011

(54) SENSOR INTEGRATION FOR AIRBAG DEPLOYMENT

(75) Inventors: Jialiang Le, Canton, MI (US); Manoharprasad K. Rao, Novi, MI (US); Clifford C. Chou, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 11/761,048

(22) Filed: Jun. 11, 2007

(65) Prior Publication Data

US 2008/0303254 A1 Dec. 11, 2008

(51) Int. Cl.
*B60R 21/16* (2006.01)

(52) U.S. Cl. .......................................... 280/735; 701/45

(58) Field of Classification Search .................. 280/735, 280/730.2, 734; 701/45; 340/438, 440, 441
See application file for complete search history.

(56) References Cited

U.S. PATENT DOCUMENTS

| | | | |
|---|---|---|---|
| 5,825,284 A | 10/1998 | Dunwoody et al. | |
| 5,899,288 A * | 5/1999 | Schubert et al. | 180/89.12 |
| 6,026,340 A | 2/2000 | Corrado et al. | |
| 6,065,558 A | 5/2000 | Wielenga | |
| 6,203,060 B1 * | 3/2001 | Cech et al. | 280/735 |
| 6,519,516 B2 | 2/2003 | Pfaeffle et al. | |
| 6,519,519 B1 | 2/2003 | Stopczynski | |
| 6,684,140 B2 | 1/2004 | Lu | |
| 6,721,659 B2 | 4/2004 | Stopczynski | |
| 6,826,468 B2 * | 11/2004 | Williams | 701/70 |
| 6,832,146 B2 * | 12/2004 | Ogata et al. | 701/45 |
| 6,904,351 B1 | 6/2005 | Hac | |
| 6,961,648 B2 | 11/2005 | Salib et al. | |
| 7,057,503 B2 * | 6/2006 | Watson | 340/440 |
| 7,069,134 B2 | 6/2006 | Williams | |
| 7,079,928 B2 | 7/2006 | Lu et al. | |
| 7,092,808 B2 | 8/2006 | Lu et al. | |
| 7,162,343 B2 * | 1/2007 | Subbian et al. | 701/45 |
| 2003/0055549 A1 | 3/2003 | Barta et al. | |
| 2003/0182042 A1 | 9/2003 | Watson et al. | |
| 2004/0019418 A1 * | 1/2004 | Lu et al. | 701/38 |
| 2004/0041358 A1 | 3/2004 | Hrovat et al. | |
| 2005/0033486 A1 | 2/2005 | Schmitt et al. | |
| 2006/0052924 A1 | 3/2006 | Prakah-Asante et al. | |
| 2006/0085112 A1 | 4/2006 | Lu et al. | |
| 2006/0108154 A1 * | 5/2006 | Mack et al. | 177/136 |
| 2006/0184299 A1 | 8/2006 | Wu et al. | |

OTHER PUBLICATIONS

Kuttenberger et al., Improved Occupant Protection through Cooperation of Active and Passive Safety Systems—Combined Active and Passive Safety CAPS, SAE International 2006-01-1144, 11 pages.

* cited by examiner

*Primary Examiner* — Paul N Dickson
*Assistant Examiner* — Timothy D Wilhelm
(74) *Attorney, Agent, or Firm* — Frank A. MacKenzie; Brooks Kushman P.C.

(57) ABSTRACT

A system and method for deploying one or more airbags in a vehicle is provided. The system comprises a passive detection device, an active detection device and a controller. The passive detection device is configured to present one or more passive signals indicative of the motion of the vehicle after the vehicle has experienced an impact. The active detection device is configured to present suspension information related to the vehicle that is indicative of the motion of the vehicle prior to the vehicle experiencing an impact. The controller is configured to predict vehicle impact and deploy the airbags in response to the suspension information and the one or more passive signals.

18 Claims, 3 Drawing Sheets

SENSOR INTEGRATION FOR AIRBAG DEPLOYMENT

BACKGROUND

1. Technical Field

Embodiments of the present invention generally relate to a system and method for deploying airbags in a vehicle.

2. Background Art

In today's Advanced Restraint System (ARS), a number of restraint controls rely on passive sensing, the sensing system for injury avoidance and/or injury severity reduction, to deploy airbags. In addition, restraint controls may need to process active sensing, the sensing system for accident avoidance and/or crash severity reduction, to enhance ARS performance. Plausibility is used to ensure that the vehicle has actually encountered a rollover event or a side impact collision prior to deploying the airbags.

The additional step of processing additional signals for plausibility purposes may delay the deployment of airbags during rollover and side impact collisions. Such a delay may increase the potential for occupants in a vehicle to make contact with the vehicle (e.g., driver's head may contact driver's side window) prior to the airbags being deployed. Active sensing systems may provide information related to a pending rollover event or side impact collision.

Accordingly, it would be desirable to combine passive and active sensing systems to ensure that airbags and other injury prevention devices are deployed at a point in time sufficient to mitigate plausibility time delays in order to prevent contact between the vehicle and occupants of the vehicle.

SUMMARY

In one non-limiting embodiment, a system for deploying one or more airbags in a vehicle is provided. The system comprises a passive detection device, an active detection device and a controller. The passive detection device is configured to present one or more passive signals indicative of the motion of the vehicle after the vehicle has experienced an impact. The active detection device is configured to present suspension information related to the vehicle that is indicative of the motion of the vehicle prior to the vehicle experiencing an impact. The controller is further configured to predict vehicle impact and deploy the airbags in response to the suspension information and the one or more passive signals.

In another non-limiting embodiment, a system for deploying one or more airbags in a vehicle is provided. The system comprises a passive detection device, an active detection device, and a controller. The passive detection device is configured to present one or more passive signals indicative of the motion of the vehicle after the vehicle has experienced an impact. The active detection device is configured to present lateral momentum information related to the vehicle that is indicative of the motion of the vehicle prior to the vehicle experiencing an impact. The controller is further configured to predict vehicle impact and deploy the airbags in response to the lateral momentum information and the one or more passive signals.

In another non-limiting embodiment, a method for deploying at least one airbag in a vehicle is provided. The method comprises the steps of generating one or more passive signals that corresponds to the motion of the vehicle after the vehicle has experienced one or more of a rollover event and a side impact collision; generating suspension information indicative of the motion of vehicle prior to the vehicle experiencing an impact; generating lateral momentum information indicative of the motion of the vehicle prior to the vehicle experiencing the impact; predicting the rollover event based on one or more of the lateral momentum and the suspension information; deploying the at least one airbag in response to the one or more of the lateral momentum, the suspension information, and the one or more passive signals.

DETAILED DESCRIPTION OF EMBODIMENTS OF THE PRESENT INVENTION

Figure 1:
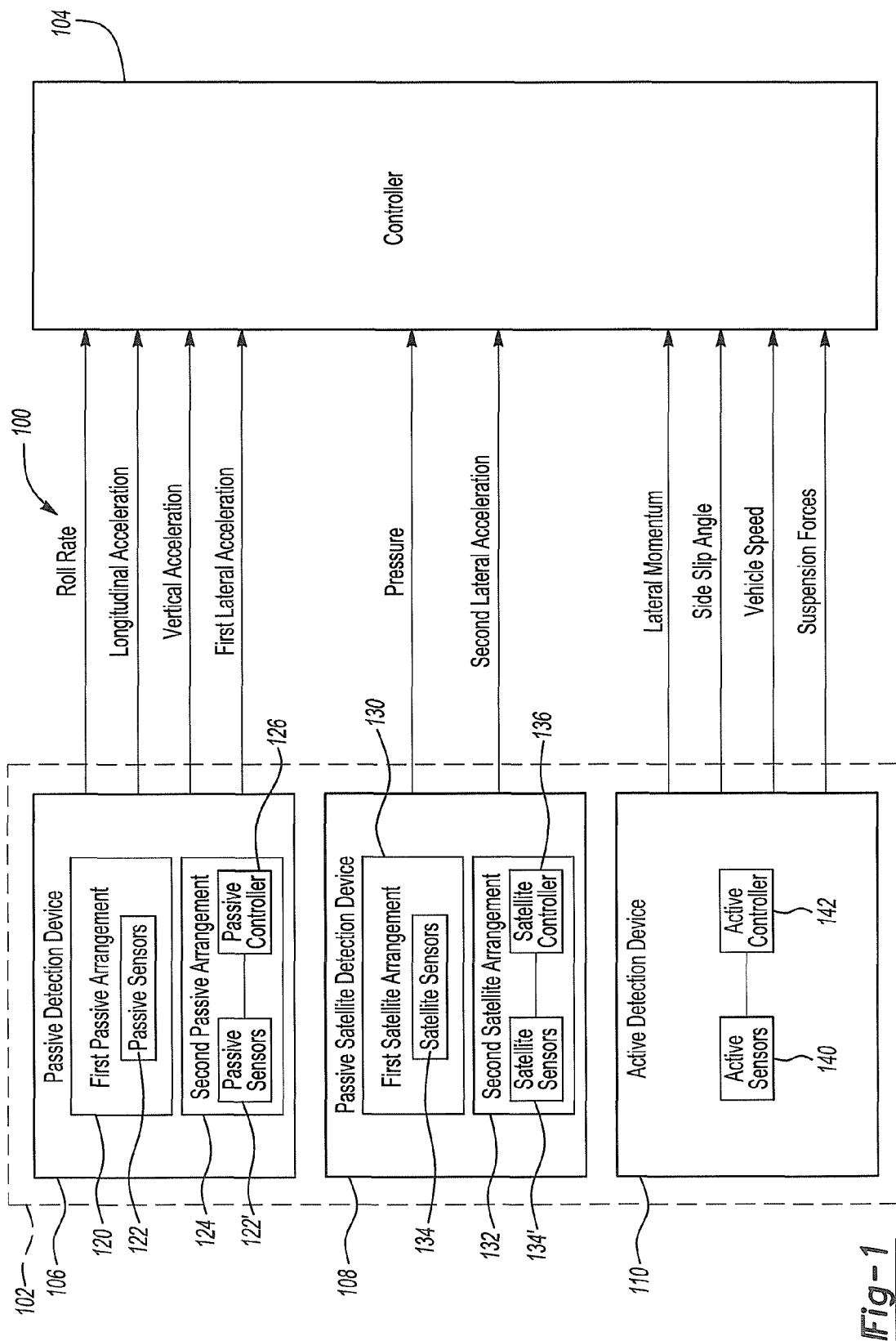
FIG. 1 illustrates a system for deploying one or more airbags in a vehicle in accordance to one embodiment of the present invention.

FIG. 1 illustrates a system generally shown at 100 for deploying one or more airbags in a vehicle in accordance to one embodiment of the present invention. The system 100 generally comprises a plurality of detection devices 102 and a controller 104. In general, the detection devices 102 are adapted to present information related to motion characteristics of the vehicle to the controller 104. Such motion characteristics of the vehicle may be used in connection with active and passive safety systems.

The detection devices 102 includes a passive detection device 106. The passive detection device 106 is configured to present passive signals to the controller 104. Such passive signals are generally used by the controller 104 along with additional signals to deploy one or more airbags and other injury preventing devices disposed about the vehicle after the vehicle experiences a collision or impact with another object. This will be discussed in more detail in connection with FIGS. 2-3.

The passive detection device 106 may be implemented either as a first passive arrangement 120 or as a second passive arrangement 124. The first and second passive arrangements 120, 124 may present similar vehicle information to the controller 104. The first passive arrangement 120 may be implemented as a first plurality of passive sensors 122. The first passive sensors 122 may be directly hardwired to the controller 104. In the first passive arrangement 120, the controller 104 may include additional hardware and software to allow the plurality of sensors to transmit raw data related to the passive signals to the controller 104. The raw data transmitted from the plurality of passive sensors 122 in the first passive arrangement 120 is generally defined as unprocessed information. The controller 104 may process the information with the additional hardware and software.

The second passive arrangement 124 may be implemented with a passive controller 126 that is coupled to a second plurality of passive sensors 122'. The passive controller 126 may be adapted to process raw data from the passive sensors 122' and transmit the information as passive signals to the controller 104 over a multiplexed bus protocol.

The passive sensors 122 and 122' may include first, second and third accelerometers and a roll rate sensor. The first, second and third accelerometers may be mounted on any portion of the vehicle that represents the center of gravity of the vehicle.

The first, second, and third accelerometers may be configured to measure car body accelerations about the x-axis (longitudinal acceleration), the y-axis (first lateral acceleration) and z-axis (vertical acceleration), respectively. The first, second, and third accelerometers may be configured to present the longitudinal, first lateral and vertical accelerations to the controller 104. For illustrative purposes, a right hand coordinate system may be superimposed on the vehicle. The x-axis of the vehicle may be defined as the axis extending between the fore and aft portions of the vehicle. The positive direction of the x-axis may be the direction pointing towards the front of the vehicle. The y-axis of the vehicle may be defined as the axis extending from the passenger side of the vehicle to the driver side of the vehicle (e.g., the axis extending the width of the vehicle). The z-axis of the vehicle may be defined as the axis extending from the bottom to top of the vehicle. The positive directions of the y-axis and z-axis are considered to be pointing towards the driver side and in an upward direction, respectively.

The roll rate sensor is adapted to measure the roll rate of the vehicle. In general, the roll rate of the vehicle is defined as the angular velocity of the vehicle as the vehicle rotates about the x-axis of the vehicle. The passive signals include the roll rate, the longitudinal acceleration, the first lateral acceleration, and the vertical acceleration.

With the first passive arrangement 120, the passive sensors 122 may transit the raw data related to the roll rate, the longitudinal acceleration, the first lateral acceleration and the vertical acceleration to the controller 104. The controller 104 processes the raw data related to the corresponding passive signals to deploy the airbags.

With the second passive arrangement 124, the passive controller 126 presents multiplexed messages related to the roll rate, the longitudinal acceleration, the first lateral acceleration and the vertical acceleration over the multiplexed bus to the controller 104. In one example, the multiplexed bus may be implemented as a high speed controller area network (CAN). In another example, the multiplexed bus may be implemented as a local area network (LAN). The particular type of multiplexed bus used in the system 100 may be varied to meet the design criteria of a particular implementation.

The plurality of detection devices 102 includes a passive satellite detection device 108. The passive satellite detection device 108 is adapted to provide satellite signals indicative of the vehicle sustaining a side impact collision. The passive satellite detection device 108 may be implemented as either a first satellite arrangement 130 or a second satellite arrangement 132. The first satellite arrangement 130 includes a first plurality of satellite sensors 134. The satellite sensors 134 are adapted to detect the transfer of energy delivered by an object to the vehicle during a side impact collision. The satellite sensors 134 include a pressure sensor (not shown) and an accelerometer sensor (not shown). The pressure sensor is positioned in the door cavity and configured to generate a pressure signal. The accelerometer sensor is configured to provide a second lateral acceleration of the vehicle.

The pressure sensor is adapted to measure the pressure change in the door cavity of the vehicle. Such a pressure change may occur in response to the front and/or rear doors of the vehicle experiencing a side impact collision. The accelerometer sensor is generally a micro-machined device and is positioned near a rocker of the vehicle. The rocker is a vehicle side structural member (or suspended structure) disposed between the A and C or D pillars of the vehicle. The accelerometer sensor is configured to measure the movement of the rocker in the event the vehicle encounters a side impact. The controller 104 is adapted to receive the signals from the pressure sensor and the accelerometer sensor and compare such signals to predetermined thresholds to determine if the vehicle has sustained a side impact. The pressure and accelerometer sensors may be directly hardwired to the controller 104 and transmit raw data related to a side impact to the controller 104. The controller 104 may include additional hardware and software to directly process and interpret the raw data (or unprocessed data) received from the pressure and the accelerometer sensors.

The second satellite arrangement 132 may be implemented with a satellite controller 136 that is hardwired coupled to a second plurality of satellite sensors 134'. The satellite controller 136 may process the raw data received from the satellite sensors 134' and transmit data received from the satellite sensors 134' over the multiplexed bus to the controller 104.

The plurality of detection devices 102 further include one or more active detection devices 110. The active detection devices 110 are adapted to provide a plurality of active signals used by the controller 104 to assess vehicle dynamic conditions and predict impact between the vehicle and an object. The active signals generally comprise information related to the motion of the vehicle prior to an impact taking place.

The active detection device 110 includes a plurality of active sensors 140 and one or more active controllers 142. The active controllers 142 are adapted to present active signals which are indicative of a pending impact between the vehicle and an object to the controller 104. The active sensors 140 transmit raw data (or unprocessed data) to the active controllers 142. The active controllers 142 convert and process the raw data into multiplexed messages and transmit the multiplexed messages as active signals to the controller 104 over the multiplexed bus. In one example, the active controller 142 is adapted to present the lateral momentum of the vehicle, the side slip angle of the vehicle, the vehicle speed and the suspension forces over the High Speed CAN bus to the controller 104 in response to the active sensors 140 providing raw data related to the lateral momentum, side slip angle, the vehicle speed and the suspension forces.

The lateral momentum is defined as:

$$P_{lateral} = mv_{lateral} \quad (1)$$

where, $P_{lateral}$ is lateral momentum, m is vehicle mass including all occupants, and $v_{lateral}$ is lateral velocity. Lateral momentum may be an indicator for potential vehicle rollover events and may assist in providing for early detection of rollover events. Lateral momentum may also be used to allow for the controller 104 to perform for a faster confirmation in the event the vehicle experiences a side impact collision. The lateral momentum may be more useful than lateral velocity in predicting vehicle rollover events. For example, the lateral momentum takes into account the mass or the overall weight of the vehicle as the vehicle enters into a rollover event.

The lateral velocity is calculated by the longitudinal velocity and the side slip angle based on a two wheel bicycle model, which is $$v_{lateral} = \tan(\beta) \cdot v_{longitudinal} \quad (2)$$

where $$\dot{\beta} \approx \omega_z - \frac{a_y}{v_{longitudinal}} = 0 \quad (3)$$

In (3), $\dot{\beta}$ is the side slip angle rate for small values of $\beta$ and $\omega_z$ is the yaw rate. Through the integration of $\dot{\beta}$, an estimate of the side slip angle may be obtained. The side slip angle generally relates to the angle between the actual direction of a rolling wheel and the pointed direction of the vehicle.

In one example, the active sensors 140 may include a plurality of wheel speed sensors (not shown) positioned about the vehicle to provide the vehicle speed. The active controllers 142 generally comprise a power train control module (not shown), or a braking module (not shown) coupled to the wheel speed sensors and configured to calculate the vehicle speed. The power train control module or the braking module may transmit the vehicle speed over the CAN bus directly to the controller 104.

The active controllers 142 may also transmit information related to suspension forces to the controller 104 as an active signal. The controller 104 may use the suspension forces to predict when the vehicle is entering into a rollover state. The controller 104 may detect rollover events at an earlier stage by monitoring the suspension forces, the lateral momentum, the roll rate, the vertical and lateral accelerations of the vehicle (e.g., the first lateral and vertical accelerations detected by the passive detection device 106). The active sensors 140 include a plurality of suspension force sensing devices (not shown) disposed about the suspension system of the vehicle. In one example, the suspension force sensing devices may measure spring displacements and use such information to determine the suspension forces or directly measure the suspension forces using load cells. The suspension force sensing devices may present the suspension forces to any one of the active controllers 142. The active detection device 110 may present the suspension forces on the CAN bus to the controller 104.

In general, while the vehicle is on a horizontal surface with steady movement, the loads on the suspension are equivalent between the left and right hand sides of the vehicle. The loads on the suspension may be different when the vehicle is in the early stages of a rollover event. The load on one side of the vehicle may be close to zero (e.g., the outboard side of the vehicle) while the load on the opposite side (e.g., the inboard side of the vehicle) of the vehicle may be very high. Such a difference in the load (e.g., forces) between the left and right sides of the suspension may indicate that the vehicle is in a rollover event.

Figure 2:
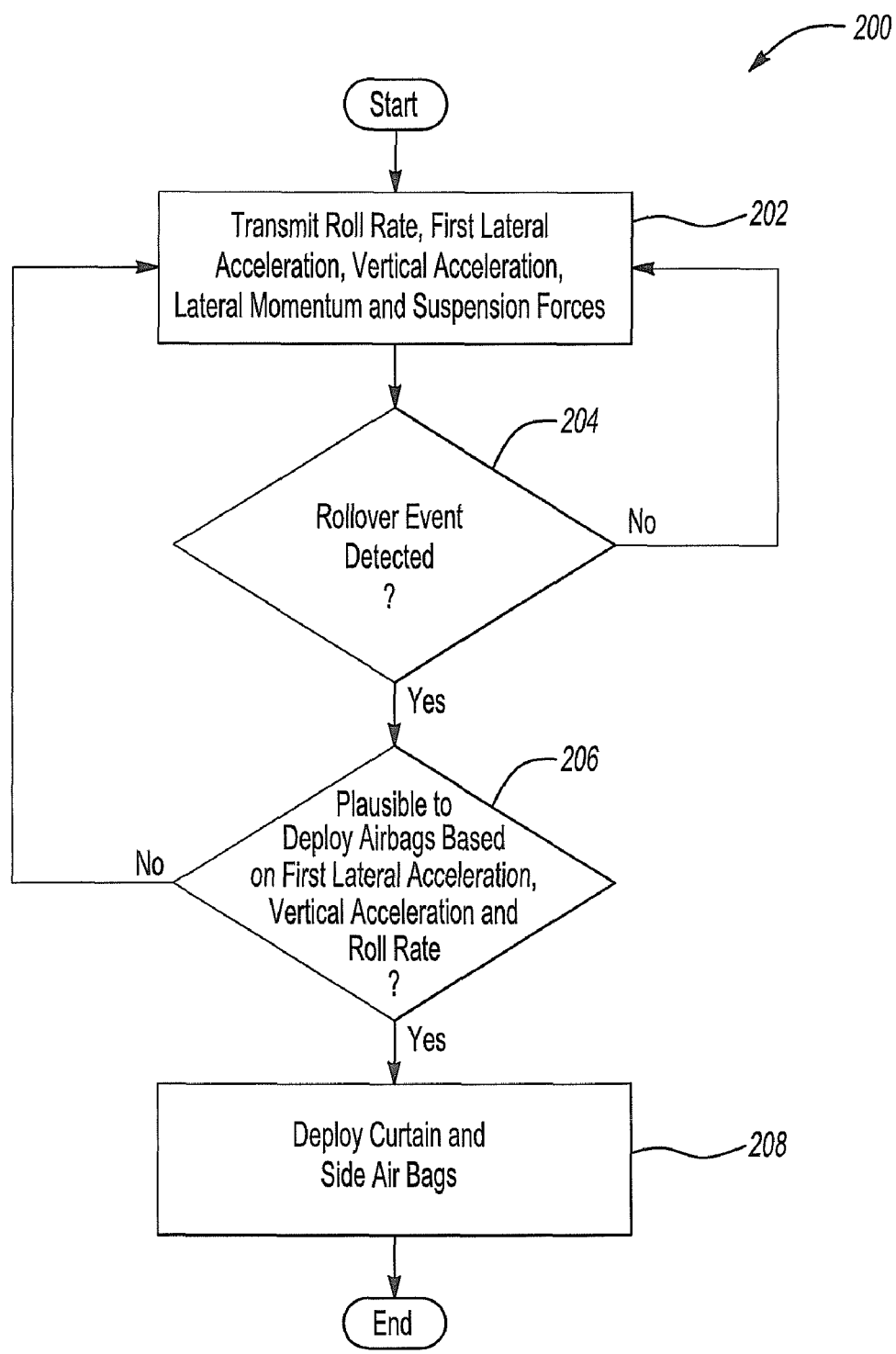
FIG. 2 illustrates a flow diagram for deploying airbags during a rollover event in accordance to one embodiment of the present invention.

FIG. 2 illustrates a flow diagram 200 for deploying airbags during a rollover event in accordance to one embodiment of the present invention. In step 202, the passive detection device 106 transmits the roll rate, the first lateral acceleration and the vertical acceleration to the controller 104. The active detection device 110 transmits the lateral momentum, and the suspension forces to the controller 104.

In step 204, the controller 104 may determine if a rollover event was detected based on the roll rate, the first lateral acceleration, the vertical acceleration, the lateral momentum and the suspension forces. If the controller 104 does not detect a pending rollover event based on the roll rate, the first lateral acceleration, the vertical acceleration, the lateral momentum and the suspension forces, the diagram 200 moves back to step 202. If the controller 104 determines that a rollover event has been detected based on the roll rate, the first lateral acceleration, the vertical acceleration, the lateral momentum and the suspension forces, the diagram moves to step 206.

In step 206, the controller 104 determines whether it is plausible to deploy the airbags based on the roll rate, and the first lateral and vertical accelerations. If the controller 104 determines that it is plausible to deploy the airbags based on the roll rate and the first lateral and vertical accelerations of the vehicle, the diagram 200 moves to step 208. Otherwise, the diagram 200 moves back to step 202.

In step 208, the controller 104 may control the restraint system to deploy curtain and side airbags to protect the driver and occupants as the vehicle enters into the rollover event. In addition to deploying curtain airbags, the controller 104 may also deploy additional injury prevention devices such as motorized pretensioners, seat controls, and a rollover protection bar. If the controller 104 does not determine that it is plausible to deploy the airbags based on the roll rate and the first lateral and longitudinal accelerations of the vehicle, the diagram 200 moves back to step 202.

The controller 104 is able to detect if a vehicle is experiencing a rollover event at an earlier stage by monitoring suspension forces and the lateral momentum of the vehicle. The lateral momentum provides information related to the internal energy of the vehicle while the vehicle is under a particular load prior to the occurrence of a rollover event. The suspension forces provide information on the forces experienced by the vehicle suspension prior to the occurrence of the rollover event which are generally indicative of a pending rollover event. By implementing a controller 104 with the capability to monitor the suspension forces and the lateral momentum along with the passive signals, the system 100 may deploy curtain airbags during low G soft trip and non-trip rollover crashes at an earlier point in time thereby reducing the likelihood of occupant injury.

Figure 3:
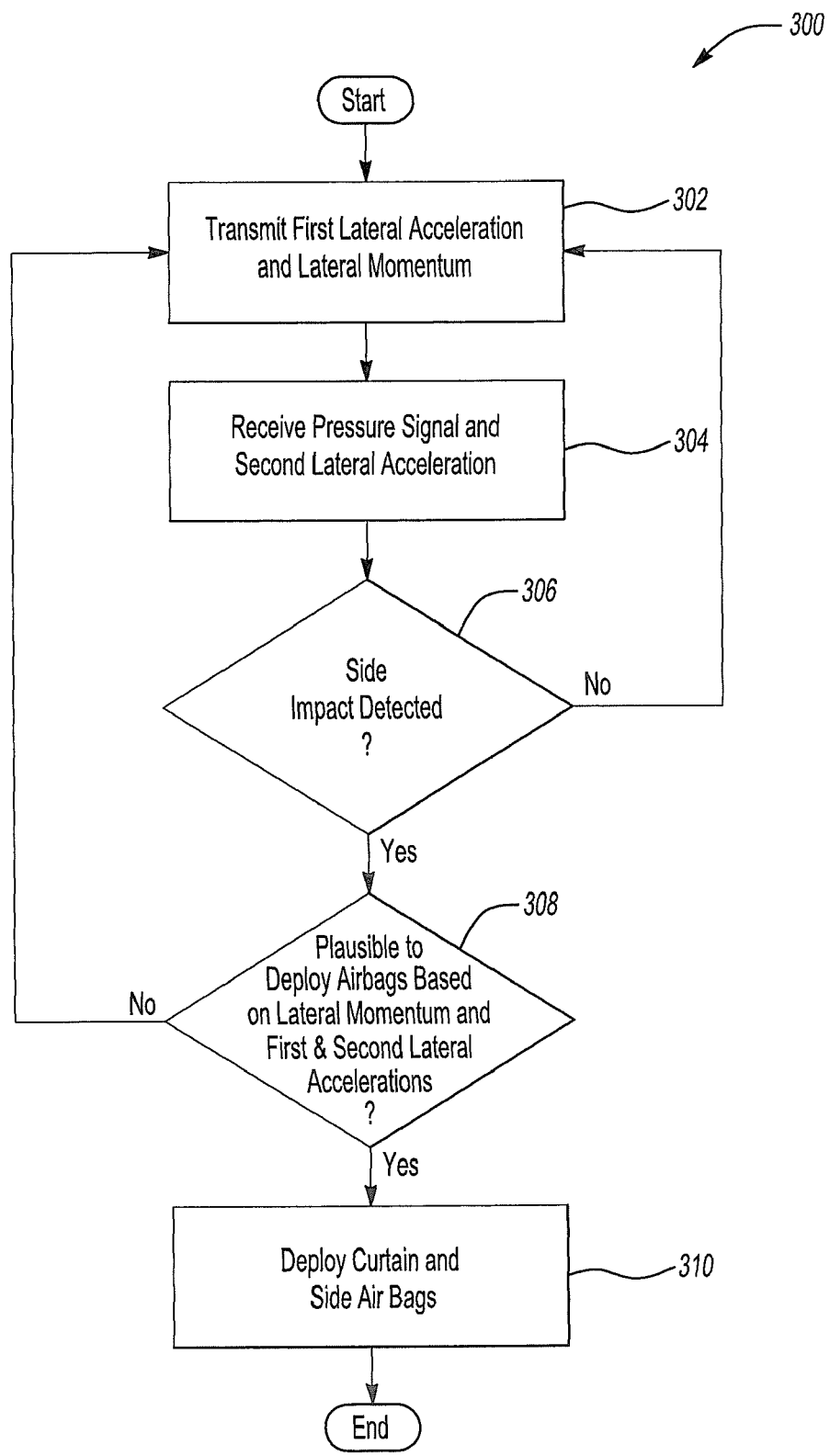
FIG. 3 illustrates a flow diagram for deploying airbags during a side impact collision in accordance to one embodiment of the present invention.

FIG. 3 illustrates a flow diagram 300 for deploying airbags during a side impact collision in accordance to one embodiment of the present invention. In step 302, the passive detection device 106 transmits the first lateral acceleration and the active detection device transmits the lateral momentum to the controller 104. In step 304, the controller 104 receives the pressure signal and the second lateral acceleration.

In step 306, the controller 104 determines whether a side impact collision has taken place based on the first lateral acceleration, the second lateral acceleration, and the pressure signal. If the controller 104 does not detect a side impact collision based on the first lateral acceleration, the second lateral acceleration, and the pressures signal, the diagram moves back to step 302. If the controller 104 detects a side impact collision based on the first lateral acceleration, the second lateral acceleration, and the pressure signal, the diagram moves to step 308.

In step 308, the controller 104 determines whether it is plausible to deploy the airbags based on the lateral momentum and the first and second lateral accelerations of the vehicle. If the controller 104 determines that it is plausible to deploy the airbags based on the lateral momentum and the first and second lateral accelerations of the vehicle, the diagram 300 moves to step 310. By monitoring the lateral momentum of the vehicle along with the first and second lateral accelerations of the vehicle, the system 100 may provide for an earlier confirmation of a side impact collision as opposed to only monitoring the first and second lateral accelerations of the vehicle for impact confirmation.

In step 310, the controller 104 may control the restraint system to deploy curtain and side airbags to protect occupants in the vehicle as the vehicle experiences a side impact collision. In addition to deploying curtain and side airbags, the controller 104 may also deploy motorized pretensioners, and seat controls to minimize injury to the occupants of the vehicle during the side impact collision. If the controller 104 does not determine that it is plausible to deploy the airbags based on the lateral momentum and the first and second lateral accelerations of the vehicle, the diagram 300 moves back to step 302.

The controller 104 is able to perform plausibility during a side impact collision at an earlier stage based on the active signals (e.g., lateral momentum) of the vehicle. The lateral momentum provides information related to the internal energy of the vehicle while the vehicle is under a particular load prior to the occurrence of a side pole impact. By utilizing active signals, the system 100 is adapted to minimize for any time delays associated with confirming side impact collisions (e.g., performing plausibility) prior to deploying curtain and side airbags.

While the best mode for carrying out the invention has been described in detail, those familiar with the art to which this invention relates will recognize various alternative designs and embodiments for practicing the invention as defined by the following claims.

What is claimed is:

1. A safety device comprising:
    a controller configured to:
        receive lateral momentum information and suspension information to assess vehicle movement prior to a vehicle experiencing a rollover event;
        receive at least one passive signal indicating that the vehicle is experiencing the rollover event; and
        detect that the vehicle is experiencing the rollover event based on the lateral momentum information, the suspension information, and the at least one passive signal,
        wherein the lateral momentum information is determined by $m*v_{lateral}$,
        where m is defined as an overall weight of the vehicle including all occupants positioned therein and $v_{lateral}$ is defined as a lateral velocity of the vehicle.

2. The safety device of claim 1 wherein the suspension information corresponds to measured forces experienced at a suspension of the vehicle.

3. The safety device of claim 1 wherein the controller is further configured to execute a plausibility mode by comparing the at least one passive signal to at least one predefined threshold prior to deploying at least one airbag.

4. The safety device of claim 3 wherein the at least one passive signal comprises vehicle roll rate information, vehicle lateral acceleration and vehicle vertical acceleration.

5. The safety device of claim 3 wherein the controller is further configured to deploy the at least one airbag after determining that the at least one passive signal exceeds the at least one predefined threshold.

6. The safety device of claim 5 wherein the at least one airbag includes a curtain airbag and a side airbag.

7. A method for detecting a vehicle rollover event, the method comprising:
    receiving lateral momentum information and suspension information to assess vehicle movement prior to a vehicle experiencing a rollover event;
    receiving at least one passive signal indicating that the vehicle is experiencing the rollover event; and
    detecting that the vehicle is experiencing the rollover event based on the lateral momentum information, the suspension information, and the at least one passive signal,
    wherein the lateral momentum information corresponds to a product of vehicle mass including an overall weight of occupants positioned therein and lateral velocity of the vehicle.

8. The method of claim 7 wherein the suspension information corresponds to measured forces experienced at a suspension of the vehicle.

9. The method of claim 7 further comprising executing a plausibility mode by comparing the at least one passive signal to at least one predefined threshold prior to deploying at least one airbag.

10. The method of claim 9 further comprising deploying the at least one airbag after determining that the at least one passive signal exceeds the at least one predefined threshold.

11. The method of claim 9 wherein the at least one passive signal comprises vehicle roll rate information, vehicle lateral acceleration, and vehicle vertical acceleration.

12. A safety device comprising:
    a controller configured to:
        receive lateral momentum information to assess vehicle movement prior to a vehicle experiencing a vehicle impact;
        receive at least one first passive signal indicating that the vehicle is experiencing the vehicle impact;
        detect that the vehicle is experiencing the vehicle impact based on the lateral momentum information and the at least one first passive signal; and
        receive at least one second passive signal such that a plausibility mode is executed with the at least one second passive signal and the lateral momentum information prior to deploying at least one airbag,
        wherein the lateral momentum information corresponds to a product of vehicle mass including an overall weight of occupants positioned within the vehicle and vehicle lateral velocity.

13. The safety device of claim 12 wherein the at least one first passive signal comprises first lateral acceleration information, second lateral acceleration information, and pressure information corresponding to a pressure change of a cavity in the vehicle.

14. The safety device of claim 12 wherein the at least one second passive signal comprises first lateral acceleration information and second lateral acceleration information.

15. The safety device of claim 12 wherein the controller is further configured to execute the plausibility mode by comparing the at least one second passive signal and the lateral momentum information to a first predefined threshold and a second predefined threshold, respectively.

16. The safety device of claim 15 wherein the controller is further configured to deploy the at least one airbag after determining that the at least one second passive signal exceeds the first predefined threshold and the lateral momentum information exceeds the second predefined threshold.

17. A safety system comprising:
    a passive detection device being configured to transmit at least one passive signal indicative of a vehicle experiencing a rollover event;
    an active detection device being configured to transmit lateral momentum information and suspension information;
    a controller being configured to:
        receive the lateral momentum information and the suspension information to assess vehicle movement prior to the vehicle experiencing the rollover event;
        receive the at least one passive signal indicating that the vehicle is experiencing the rollover event; and
        detect that the vehicle is experiencing the rollover event based on the lateral momentum information, the suspension information, and the at least one passive signal,
        wherein the lateral momentum information corresponds to a product of vehicle mass including an overall weight of at least one occupant positioned therein and lateral velocity of the vehicle.

18. A safety system comprising:
    a passive detection device being configured to transmit a first passive signal indicative of a vehicle experiencing an impact and a second passive signal;

an active detection device being configured to transmit lateral momentum information;
a controller being configured to:
receive the lateral momentum information to assess vehicle movement prior to the vehicle experiencing an impact;
receive the first passive signal;
detect that the vehicle is experiencing the impact based on the lateral momentum information and the first passive signal; and
receive the second passive signal such that a plausibility mode is executed with the second passive signal and the lateral momentum information prior to deploying at least one airbag,
wherein the lateral momentum information corresponds to a product of vehicle mass including an overall weight of at least one occupant positioned within the vehicle and vehicle lateral velocity.

* * * * *